(12) United States Patent
Taguchi et al.

(10) Patent No.: US 8,704,892 B2
(45) Date of Patent: Apr. 22, 2014

(54) ELECTRONIC MIRROR

(75) Inventors: Kiyotaka Taguchi, Kariya (JP); Ifushi Shimonomoto, Okazaki (JP); Takashi Aoki, Gifu (JP)

(73) Assignee: Denso Corporation, Kariya (JP)

( * ) Notice: Subject to any disclaimer, the term of this patent is extended or adjusted under 35 U.S.C. 154(b) by 386 days.

(21) Appl. No.: 13/306,193

(22) Filed: Nov. 29, 2011

(65) Prior Publication Data
US 2012/0140074 A1 Jun. 7, 2012

(30) Foreign Application Priority Data

Dec. 1, 2010 (JP) ................................. 2010-268489

(51) Int. Cl.
*H04N 7/18* (2006.01)
*G06K 9/00* (2006.01)
*G06T 15/10* (2011.01)

(52) U.S. Cl.
USPC ............................ 348/148; 382/154; 345/427

(58) Field of Classification Search
CPC .............. H04N 7/181; H04N 13/0239; H04N 2013/0081; B60R 1/00; B60R 2300/105; B60R 11/04; B60R 2300/802; G06T 7/0075; G06T 2207/10012; G06T 7/0022
USPC ............................ 348/148; 382/154; 345/427
See application file for complete search history.

(56) References Cited

U.S. PATENT DOCUMENTS

2007/0177012 A1* 8/2007 Ogawara et al. .............. 348/118
2008/0191963 A1 8/2008 Ootaki et al.

FOREIGN PATENT DOCUMENTS

| JP | 05-57620 | 7/1993 |
|---|---|---|
| JP | 11-34699 | 2/1999 |
| JP | 2003-219413 | 7/2003 |
| JP | 2009-83618 | 4/2009 |
| JP | 2009-192434 | 8/2009 |

* cited by examiner

*Primary Examiner* — Dave Czekaj
*Assistant Examiner* — Tison B Owens
(74) *Attorney, Agent, or Firm* — Harness, Dickey & Pierce, PLC

(57) ABSTRACT

An electronic mirror includes a first display section, a second display sections and a half mirror disposed between the display sections. The first display section displays a surrounding image captured by an imaging device in a display region. The second display section displays a frame image that has a shape taken along an outer periphery of the display region. A distance between the first display section and a point of the half mirror is greater than a distance between the second display section and the point the half mirror so that the frame image is offset relative to the outer periphery of the surrounding image when viewed in the half mirror.

5 Claims, 6 Drawing Sheets

ELECTRONIC MIRROR

CROSS REFERENCE TO RELATED APPLICATIONS

The present application is based on and claims priority to Japanese Patent Application No. 2010-268489 filed on Dec. 1, 2010, the disclosure of which is incorporated herein by reference.

TECHNICAL FIELD

The present invention relates to an electronic mirror disposed in a vehicle.

BACKGROUND

Japanese Patent No. 3,916,958 and JP-A-2009-83618 disclose systems in which cameras are disposed on a rear of a vehicle and side mirrors, images of areas behind and to sides of the vehicle, that is, a rearview area and a side-view areas of the vehicle, are captured with the cameras, and the images are displayed with the display device disposed in a dashboard.

Because the system can capture an image of a blind area of a mirror, the system can be suitably used when the vehicle is put into a garage, when the vehicle is parallel parked, or when the vehicle is started.

In the above-described systems, real images captured with the cameras are displayed in full-screen or a divided screen. Thus, it is difficult to understand intuitively which image shows which area (e.g., the rearview area or the side-view area). In addition, because the images are displayed planarly and a sense of depth is not in the images, it is difficult to understand a distance to an object in the images.

SUMMARY

In view of the foregoing problems, it is an object of the present invention to provide an electronic mirror that enables a viewer to understand intuitively which image shows which area and enables the viewer to feel a sense of depth.

An electronic mirror according to an aspect of the present invention includes a first display section, a second display section, and a half mirror. The electronic mirror is disposed in a vehicle that includes an optical mirror and an imaging device. The optical mirror reflects at least one of areas behind and to sides of the vehicle. The imaging device captures an image of the at least one of the areas as a surrounding image. The first display section is disposed along a first plane so as to face a viewer. The first display section includes a display region having a shape similar to a shape of a reflecting surface of the optical mirror. The first display section displays the surrounding image captured by the imaging device in the display region. The second display section is disposed on a second plane that intersects with the first plane. The second display section displays a frame image that has a shape taken along an outer periphery of the display region. The half mirror has a plate shape. The half mirror is disposed in a space between the first display section and the second display section. The half mirror displays a real image of the surrounding image displayed by the first display section and a virtual image of the frame image displayed by the second display section in such a manner that the real image of the surrounding image and the virtual image of the frame image overlap each other. A distance between the first display section and a point of the half mirror is greater than a distance between the second display section and the point of the half mirror so that the frame image is offset relative to the outer periphery of the surrounding image when the real image of the surrounding image and the virtual image of the frame image are viewed in the half mirror.

In the above-described electronic mirror, the surrounding image is displayed in the display region having the shape similar to the shape of the reflecting surface of the optical mirror. Thus, the electronic mirror enables a viewer to understand intuitively which image shows which area. In addition, because the first display section, the second display section, and the half mirror are disposed so that the frame image is offset relative to the outer periphery of the surrounding image when the real image of the surrounding image and the virtual image of the frame image are viewed in the half mirror, the viewer can feel a sense of depth and can easily understand a distance to an object in the surrounding image.

BRIEF DESCRIPTION OF THE DRAWINGS

Additional objects and advantages of the present invention will be more readily apparent from the following detailed description of embodiments when taken together with the accompanying drawings. In the drawings.

DETAILED DESCRIPTION (First Embodiment)

An electronic mirror according to a first embodiment of the present disclosure will be described with reference to drawings.

Figure 1:
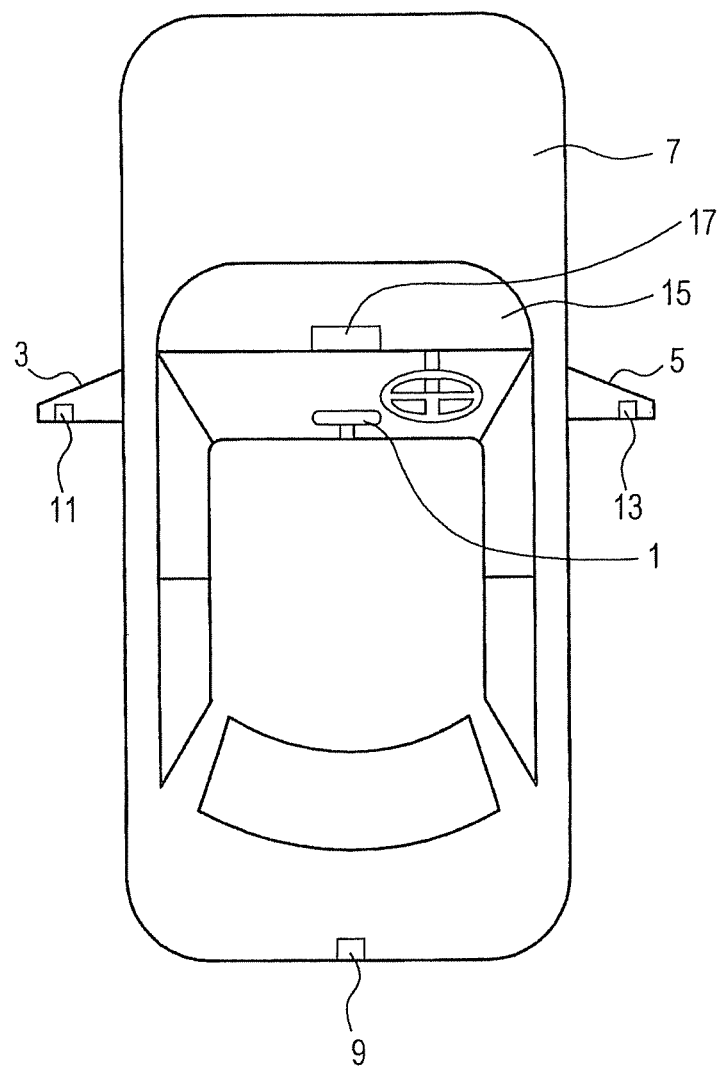
FIG. 1 is a diagram showing a system relating to an electronic mirror according a first embodiment of the present disclosure.
Figure 2:
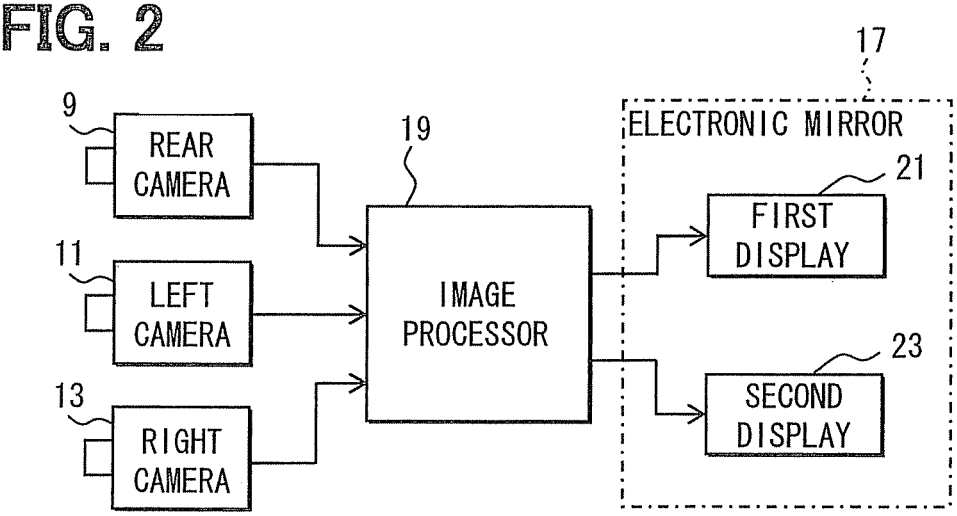
FIG. 2 is a block diagram showing the system relating the electronic mirror according to the first embodiment.

As shown in FIG. 1 and FIG. 2, a vehicle 7 includes a rearview mirror 1, a left side mirror 3, and a right side mirror 5. On a rear side of the vehicle 7, a rear camera 9 that captures images of a rearview area of the vehicle 7 is attached. The left side mirror 3 is attached with a left camera 11 that captures images of a left-view area and a left rearview area of the vehicle 7. The right side mirror 5 is attached with a right camera 13 that captures images of a right-view area and a right rearview area of the vehicle 7. The rearview area is an area behind the vehicle 7. The left-view area is an area facing a left side of the vehicle 7, and the left rearview area is a rearward area of the left-view area. The right-view area is an area facing a right side of the vehicle 7, and the right rearview area is a rearward area of the right-view area. Each of the rearview mirror 1, the left side mirror 3, and the right side mirror 5 can operate as an optical mirror that reflects at least one of areas behind and to the sides of the vehicle 7. Each of the rear camera 9, the left camera 11, and the right camera 13 can operate as an imaging device that captures an image of the at least of the areas.

In a dashboard 15 of the vehicle 7, an electronic mirror 17 is disposed. The electronic mirror 17 displays surrounding images captured by the rear camera 9, the left camera 11, and the right camera 13.

In the present embodiment, as shown in FIG. 2, information of the images captured by the rear camera 9, the left camera 11, and the right camera 13 are processed with an image processor 19 that includes a microcomputer. The electronic mirror 17 includes a first display panel 21 and a second display panel 23. The image processor 19 outputs various signals to the first display panel 21 and the second display panel 23. The first display panel 21 and the second display panel 23 can operate as a first display section and a second display section, respectively. Each of the first display panel 21 and the second display panel 23 electrically changes a displayed image.

Figure 3:
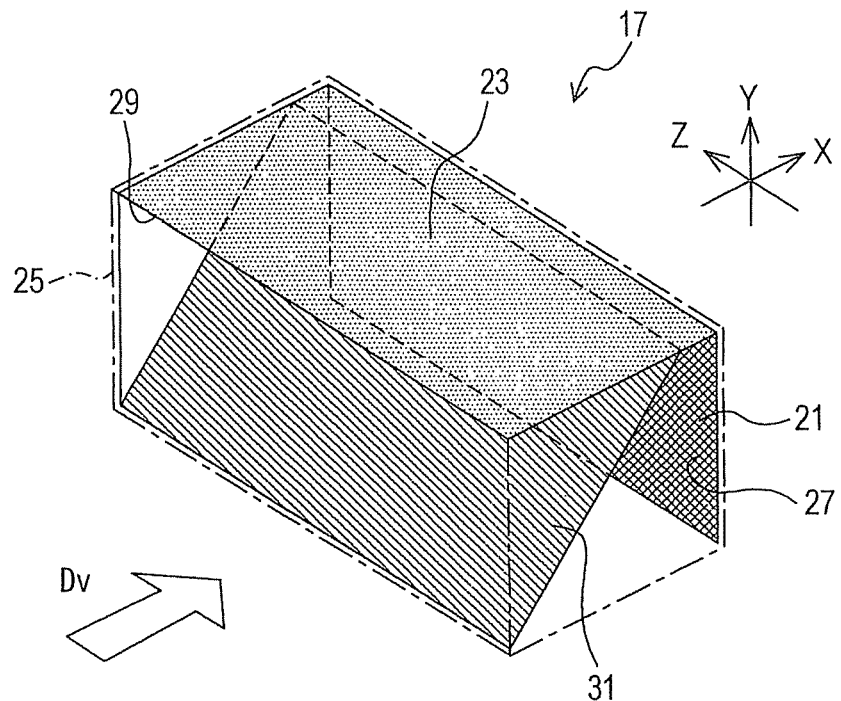
FIG. 3 is a perspective view of the electronic mirror according to the first embodiment.
Figure 4:
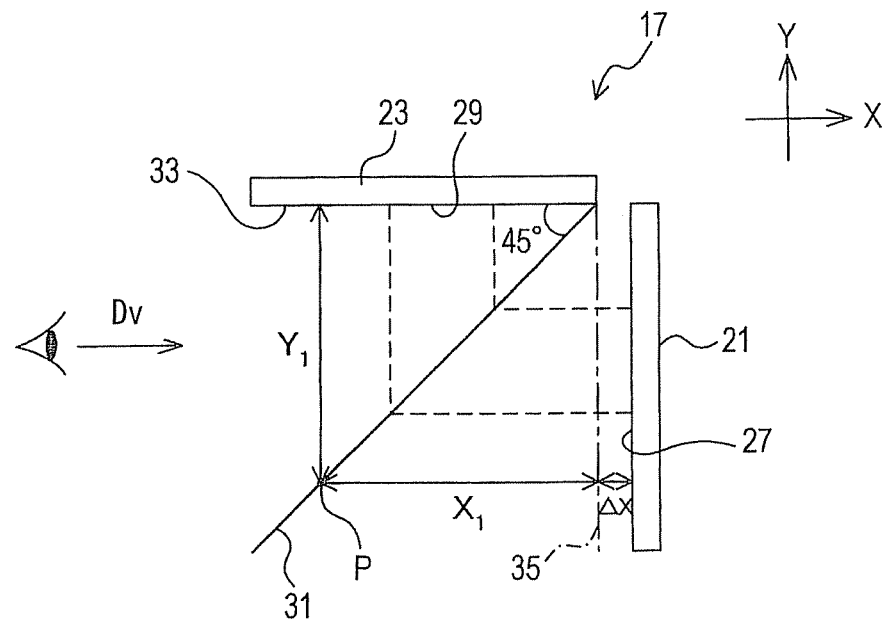
FIG. 4 is a diagram showing positional relationships among components in the electronic mirror according to the first embodiment.

As shown in FIG. 3 and FIG. 4, the electronic mirror 17 has a rectangular parallelepiped shape. The electronic mirror 17 is built into the dashboard 15 so that images displayed in the electronic mirror 17 are visible to a viewer, such as a driver, in a visual direction Dv. The visual direction Dv is a rear-to-front direction of the vehicle 7. On a side of the electronic mirror 17 facing the viewer, a transparent panel 25 is attached.

The first display panel 21 has a plate shape extending in a Y-axis direction and a Z-axis direction perpendicular to the visual direction. The first display panel 21 has a first display surface 27 on which images are displayed. The first display surface 27 extends in the Y-axis direction and the Z-axis direction. The first display surface 27 faces rearward opposite from the visual direction Dv so that the first display surface 27 faces the viewer. Upper portions of the first display panel 21 and the first display surface 27 may be inclined from a vertical line to the ground to a front of the vehicle 7, for example, at about 10 degrees, so that the viewer can easily see the images on the first display surface 27.

The second display panel 23 is disposed at an upper portion of the electronic mirror 17 in parallel with the visual direction Dv. The second display panel 23 extends along an X-axis direction and the Z-axis direction. The second display panel 23 has a second display surface 29 on which images are displayed. The second display surface 29 faces downward so as to be perpendicular to the first display surface 27. The second display panel 23 and the second display surface 29 may be inclined from the ground, for example, at about 10 degrees in such a manner that sides of the second display panel 23 and the second display surface 29 adjacent to the viewer rise.

In a space between the first display panel 21 and the second display panel 23, a half mirror 31 is disposed. The half mirror 31 is inclined at 45 degrees from each of the first display panel 21 and the second display panel 23. As shown in FIG. 4, when a plane including the second display surface 29 is defined as a second plane 33 and a plane perpendicular to second plane 33 as a first plane 35, the half mirror 31 extends from an intersection of the first plane 35 and the second plane 33 toward the viewer at an angle of 45 degrees with respect to the first plane 35 and the second plane 33. In other words, the half mirror 31 extends from the intersection of the first plane 35 and the second plane 33 in such a manner that the half mirror 31 bisects an angle between the first plane 35 and the second plane 33.

The first display surface 27 is disposed along the first plane 35. The first display surface 27 is disposed to an opposite side of the first plane 35 from the half mirror 31 and is distant from the first plane 35. In a front to rear direction of the vehicle 7, the first display surface 27 is located in front of the first plane 35. The second display surface 29 is on the second plane 33.

Thus, at any point P on the half mirror 31, a distance (X1+ΔX) from the half mirror 31 to the first display surface 27 of the first display panel 21 is greater than a distance Y1 from the half mirror 31 to the second display surface 29 of the second display panel 23, for example, by 10 mm or more. Note that Y1 is equal to X1.

Next, the images displayed in the electronic mirror 17 will be described. As shown in FIG. 5B, a display region 37 having an approximately trapezoid shape similar to a shape of a reflecting surface of the rearview mirror 1 is provided in an upper portion of the first display surface 27 of the first display panel 21. In the display region 37, the surrounding image captured by the rear camera 9 is displayed.

In a left lower portion of the first display surface 27, a display region 39 having an approximately rectangular shape similar to a shape of a reflecting surface of the left side mirror 3 is provided. In the display region 39, the surrounding image captured by the left camera 11 is displayed.

In a right lower portion of the first display surface 27, a display region 41 having an approximately rectangular shape similar to a shape of a reflecting surface of the right side mirror 5 is provided. In the display region 41, the surrounding image captured by the right camera 13 is displayed. In a peripheral region 42 surrounding the display regions 37-41, no image is displayed. For example, a monotone is displayed in the peripheral region 42.

Figure 5A:
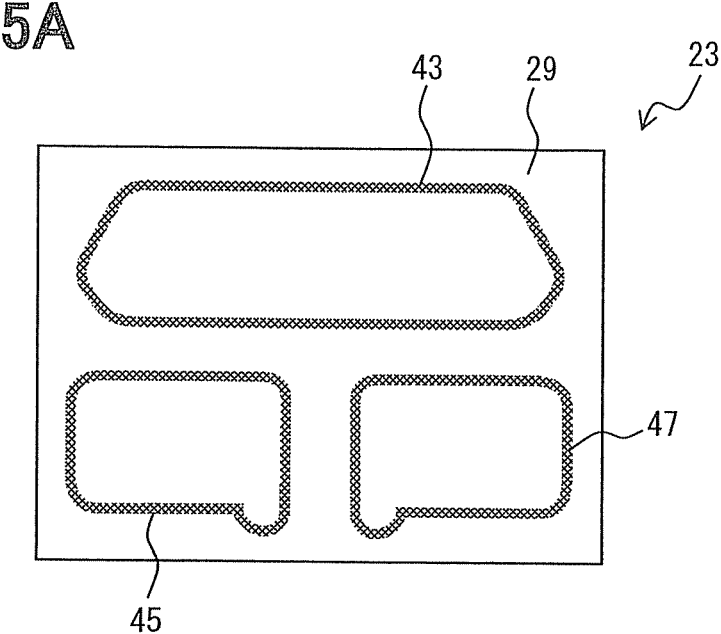
FIG. 5A is a diagram showing frame images displayed on a second display panel.
Figure 5B:
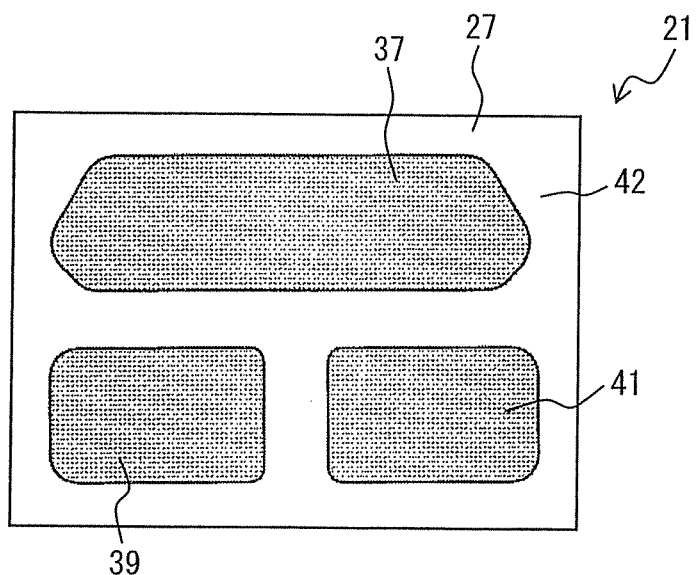
FIG. 5B is a diagram showing surrounding images displayed on a first display panel.

On the other hand, as shown in FIG. 5A, in an upper portion of the second display surface 29 of the second display panel 23, which is located to a right in FIG. 4, a display region 43 having a frame shape similar to an outer periphery of the reflecting surface of the rearview mirror 1 is provided.

In a left lower portion of the second display surface 29, a display region 45 having a frame shape with a shaft similar to a shape of the reflecting surface and an outer periphery of the left side mirror 3 is provided. At a right lower portion of the second display surface 29, a display region 47 having a frame shape with a shaft similar to a shape of the reflecting surface and an outer periphery of the right side mirror 5 is provided.

On line-shaped display regions 43-47 in the second display panel 23, for example, gray color is displayed as frame images. In the present embodiment, the display regions 43-47 in the second display panel 23 and the display regions 37-41 in the first display panel 21 are designed in such a manner that each frame image in the second display panel 23 is located along an outer periphery of a corresponding surrounding image in the first display panel 21 when the images on the half mirror 31 is viewed by the viewer in the visual direction. In other words, each frame shape displayed by the second display panel 23 has a shape taken along an outer periphery of a corresponding display region 37-41 in the first display panel 21.

The arrangement of the display regions 37-41 on the first display surface 27 and the arrangement of the display regions 43-47 on the second display surface 29 are determined in such a manner that each frame image in the second display panel 23 corresponds to an outer periphery of a corresponding surrounding image in the first display panel 21 when the second display surface 29 of the second display panel 23 shown in FIG. 5A and the first display surface 27 of the first display panel 21 shown in FIG. 5B are overlapped.

Figure 6A:
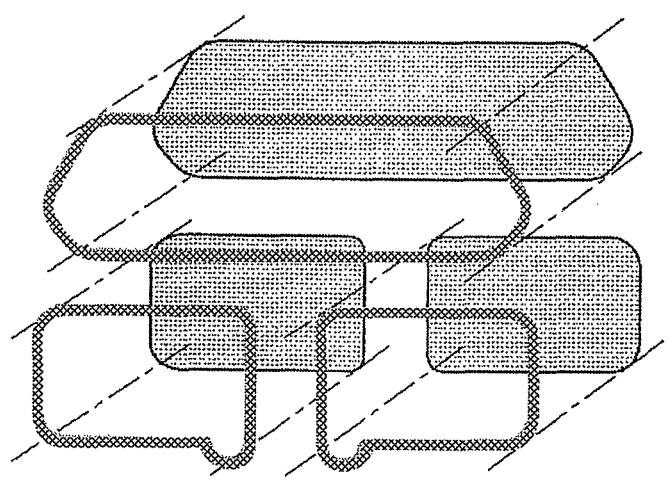
FIG. 6A is an exploded view showing a positional relationship between a frame image displayed by the second display panel and the surrounding image displayed by the first display panel.

Thus, the first display panel 21 displays the surrounding image captured by the rear camera 9 in the display region 37, displays the surrounding image captured by the left camera 11 in the display region 39, and displays the surrounding image captured by the right camera 13 in the display region 41. The second display panel 23 displays the frame image of the rearview mirror 1, the frame image of the left side mirror 3, and the frame image of the right side mirror 5. Accordingly, when viewed in the visual direction, as shown in FIG. 6A, on the half mirror 31, the surrounding images in the display regions 37-41 and the corresponding frame images in the display regions 43-47 are overlapped.

Specifically, as shown in FIG. 4, when viewed in the visual direction, the surrounding images in the first display panel 21 are seen through the half mirror 31, that is, as images in the half mirror 31. The frame images in the second display panel 23 are reflected by the half mirror 31. Thus, the half mirror 31 displays real images of the surrounding images displayed by the first display panel 21 and virtual images of the frame images displayed by the second display panel 23 in such a manner that the real images of the surrounding image and the virtual images of the fame images overlap each other.

In other words, the first display panel 21, the second display panel 23, and the half mirror 31 are displayed as described above, and the display regions 37-47 are designed in such a manner that the frame images of the second display panel 23 overlap the outer peripheries of the surrounding images of the first display panel 21. Thus, when the electronic mirror 17 is viewed in the visual direction, the frame-shaped lines (for example, gray lines having a predetermined width) are located along the outer peripheries of the display regions 37-41 in the first display panel 21.

Figure 6B:
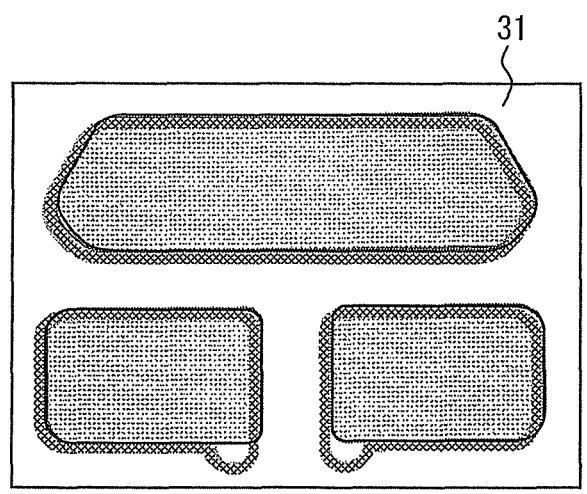
FIG. 6B is a diagram showing a composite image of the frame image and the surrounding image displayed by the electronic mirror.

In the present embodiment, the distance between the first display surface 27 of the first display panel 21 and a point of the half mirror 31 is greater than the distance between the second display surface 29 of the second display panel 23 and the point of the half mirror 31. When the viewer views the electronic mirror 17, the viewer does not view the images in a direction perpendicular to the first display panel 21 from a fixed view point, that is, in a single visual direction, but views from a direction slightly shifted from the direction perpendicular to the first display panel 21. Thus, when the real images of the surrounding images and the virtual images of the frame images are viewed in the half mirror 31, the frame images are slightly offset relative to the outer peripheries of the surrounding images as shown in FIG. 6B.

Specifically, the frames images displayed on the second display surface 29 is seen in front of the surrounding images displayed on the first display surface 27 because the distance between the half mirror 31 and the second display surface 29 is shorter than the distance between the half mirror 31 and first display surface 27. In other words, the frame images are projected from the surrounding images toward the viewer when the real images of the surrounding images and the virtual images of the frame images are viewed in the half mirror 31.

Because the frames images are seen in front of the surrounding images, a sense of depth is provided in the images and the viewer can feel a sense of depth. As described above, in the present embodiment, the first display panel 21 includes the display regions 37-41, which have shapes similar to the shapes of the corresponding optical mirrors, for displaying the surrounding images, and the second display panel 23 includes the display regions 43-37, which have shapes similar to the outer peripheries of the corresponding optical mirrors, for displaying the frame images. In addition, the distance between the half mirror 31 and the first display panel 21 is greater than the distance between the half mirror 31 and the second display panel 23.

Thus, the viewer can intuitively understand which image in the electronic mirror 17 is captured with which camera more easily than a conventional electronic mirror. In addition, because the sense of depth is provided in the images, the viewer can understand a distance to an object in the surrounding images more easily.

(Second Embodiment)

Figure 7:
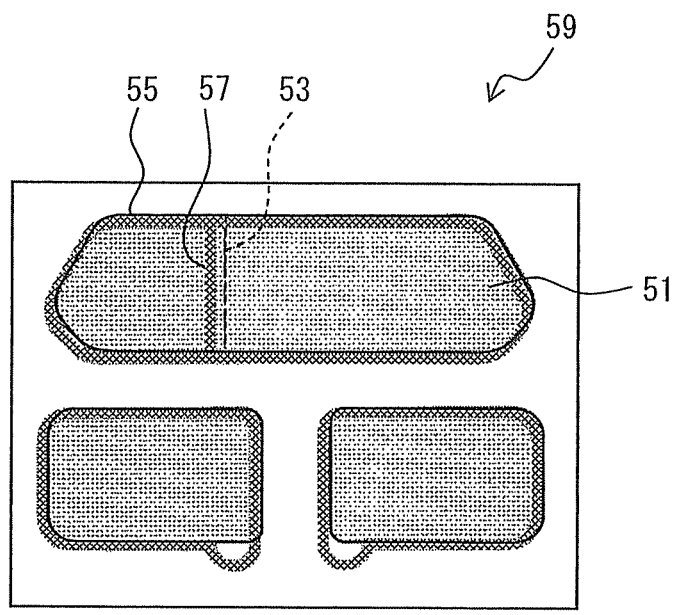
FIG. 7 is a diagram showing a composite image of a frame image and a surrounding image displayed by an electronic mirror according to a second embodiment of the present disclosure.

An electronic mirror 59 according to a second embodiment of the present disclosure will be described with reference to FIG. 7.

A first display panel according to the present embodiment includes a display region 51 corresponding to the rearview mirror 1. In the display region 51, a first assistant line 53 cuts across the display region 51 in a vertical direction of the display region 51. A second display panel according to the present embodiment displays a frame image 55 corresponding to the rearview mirror 1. In the frame image 55, a second assistant line 57 cuts across the frame image 55 in a vertical direction of the frame image 55.

The first assistant line 53 and the second assistant line 57 completely overlap each other when a first display surface of the first display panel and a second display surface of the second display panel overlap each other. That is, a position of the first assistant line 53 in the display region 51 corresponds to a position of the second assistant line 57 in the frame image 55.

In other words, in the present embodiment, the first assistant line 51 and the second assistant line 53 are respectively drawn in the display region 51 of the first display panel and the frame image 55 in the second display panel so as to cut across the display region 51 and the frame image 55. Thus, when a viewer views the electronic mirror 59, the viewer can feel a sense of depth more easily.

(Third Embodiment)

An electronic mirror according to a third embodiment of the present disclosure will be described with reference to FIG. 8.

Figure 8:
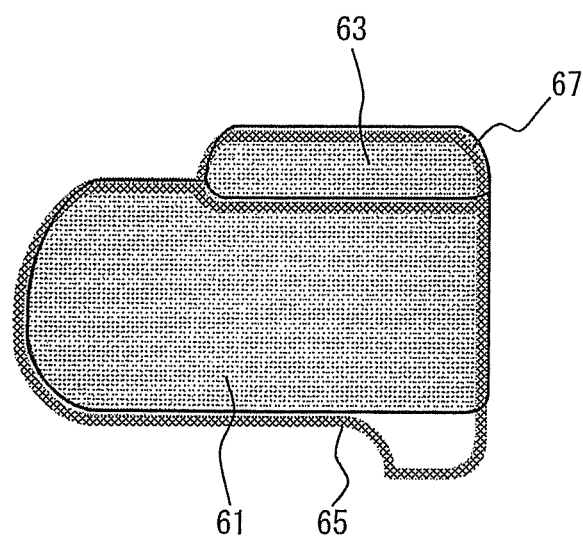
FIG. 8 is a diagram showing a composite image of a frame image and a surrounding image displayed by an electronic mirror according to a third embodiment of the present disclosure.

As shown in FIG. 8, in the present embodiment, shapes of display regions in a first display panel and a second display panel are different from the shapes of the display regions according to the first embodiment. The first display panel includes a display region 61 and a display region 62 that is arranged on an upper portion of the display region 61 so as to overlap a part of the display region 61. The display region 61 has a shape similar to the shape of the left side mirror 3. The display region 62 has a shape similar to the shape of the rearview mirror 1 and is smaller than the display region 61.

The second display panel includes frame images 65, 67 having shapes taken along outer peripheries of the display regions 61, 63. On the half mirror 31, the frame images 65, 67 are located along the outer peripheries of the display regions 61, 67. Thus, effects similar to the effects of the first embodiment can be achieved.

(Fourth Embodiment)

Figure 9:
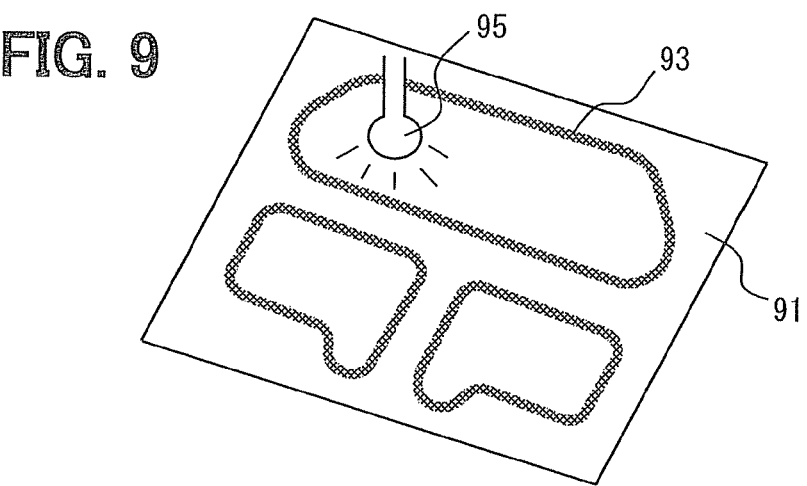
FIG. 9 is a diagram showing a configuration for displaying a frame image in an electronic mirror according to a fourth embodiment of the present disclosure.

An electronic mirror according to a fourth embodiment of the present invention will be described with reference to FIG. 9.

The electronic mirror according to the present embodiment includes a transparent substrate 91 instead of the second display panel in the first embodiment. On the transparent substrate 91, frame images 93 are drawn or attached. The frame images 93 are lighted up by a light 95 from the rear, that is, a side opposite from the half mirror 31. The transparent substrate 91 is an example of a display plate on which a frame image is formed.

Also in the present embodiment, effects similar to the effects of the first embodiment can be achieved. In addition, a configuration of the first display panel can be simple.

(Fifth Embodiment)

Figure 10:
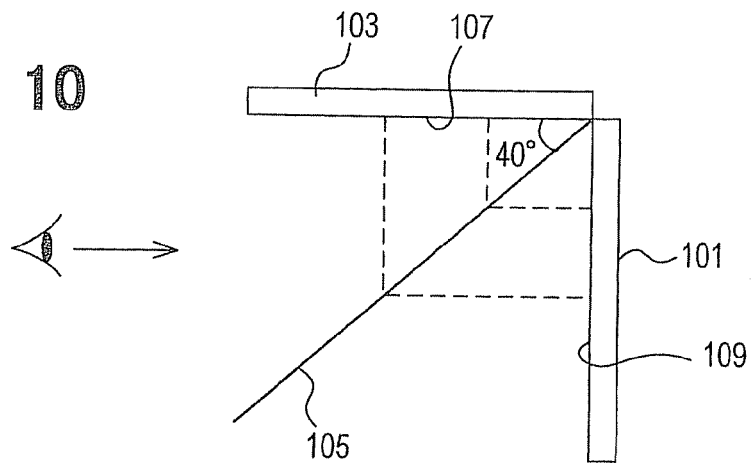
FIG. 10 is a diagram showing positional relationships among components in an electronic mirror according to a fifth embodiment of the present disclosure.

An electronic mirror according to a fifth embodiment of the present invention will be described with reference to FIG. 10.

The electronic mirror according to the present embodiment includes a first display panel 101, a second display panel 103, and a half mirror 105. The first display panel 101 and the second display panel 103 are arranged perpendicularly with each other. The half mirror 105 extends from an intersection of the first display panel 101 and the second display panel 103.

A first angle is defined as an angle between the first display panel 101 and the half mirror 105, and a second angle is defined as an angle between the second display panel 103 and the half mirror 105. The first angle is different from the second angle. For example, the second angle is set to 40 degrees.

Accordingly, a distance between a first display surface 109 of the first display panel 101 and a point of the half mirror 105 can be greater than a distance between a second display surface 107 of the second display panel 103 and the point of the half mirror 105.

Thus, also in the present embodiment, effects similar to the effects of the first embodiment can be achieved.

(Sixth Embodiment)

Figure 11:
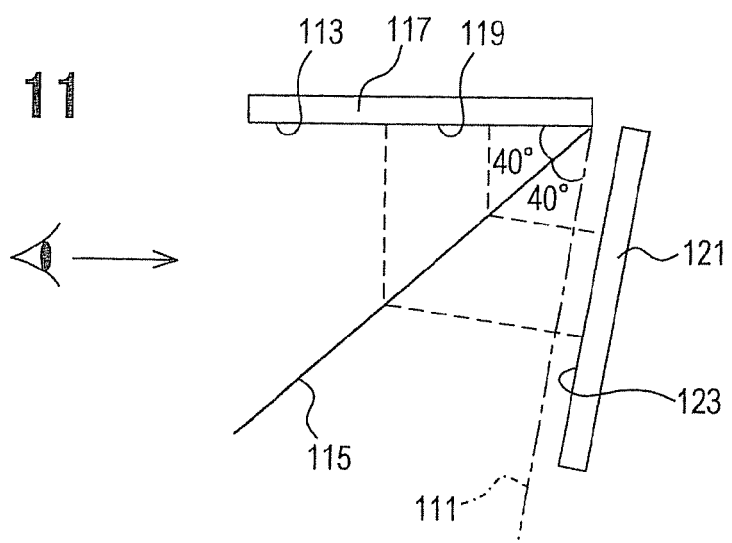
FIG. 11 is a diagram showing positional relationships among components in an electronic mirror according to a sixth embodiment of the present disclosure.

An electronic mirror according to a sixth embodiment of the present disclosure will be described with reference to FIG. 11.

The electronic mirror according to the present embodiment includes a first display panel 121, a second display panel 117, and a half mirror 115. The first display panel 121 has a first display surface 123 disposed along a first plane 111. The first display surface 123 is disposed to an opposite side of the first plane 111 from the half mirror 115 and is distant from the first plane 111. In the front to rear direction of the vehicle 7, the first display surface 123 is disposed in front of the first plane 111.

The second display panel 117 has a second display surface 119. The second display surface 119 is disposed on a second plane 113. The first plane 111 intersects with the second plane 113 at an angle different from 90 degrees. For example, the first plane 111 intersects with the second plane 113 at 80 degrees. The half mirror 115 extends from an intersection of the first plane 111 and the second plane 113 in such a manner that the half mirror 115 bisects the angle between the first plane 111 and the second plane 113.

Accordingly, a distance between the first display surface 123 of the first display panel 121 and a point of the half mirror 115 can be greater than a distance between the second display surface 119 of the second display panel 117 and the point of the half mirror 115.

Thus, also in the present embodiment, effects similar to the effects of the first embodiment can be achieved.

While the disclosure has been described with reference to foregoing embodiments thereof, it is to be understood that the disclosure is not limited to the foregoing embodiments and constructions. The disclosure is intended to cover various modification and equivalent arrangements.

What is claimed is:

1. An electronic mirror disposed in a vehicle that includes an optical mirror and an imaging device, the optical mirror reflecting at least one of areas behind and to sides of the vehicle, the imaging device capturing an image of the at least one of the areas as a surrounding image, the electronic mirror comprising:
    a first display section disposed along a first plane so as to face a viewer, the first display section including a display region having a shape similar to a shape of a reflecting surface of the optical mirror, the first display section displaying the surrounding image captured by the imaging device in the display region;
    a second display section disposed on a second plane that intersects with the first plane, the second display section displaying a frame image that has a shape taken along an outer periphery of the display region; and
    a half mirror having a plate shape, the half mirror disposed in a space between the first display section and the second display section, the half mirror displaying a real image of the surrounding image displayed by the first display section and a virtual image of the frame image displayed by the second display section in such a manner that the real image of the surrounding image and the virtual image of the frame image overlap each other,
    wherein a distance between the first display section and a point of the half mirror is greater than a distance between the second display section and the point of the half mirror so that the frame image is offset relative to the outer periphery of the surrounding image when the real image of the surrounding image and the virtual image of the frame image are viewed in the half mirror.

2. The electronic mirror according to claim 1,
    wherein the second plane intersects with the first plane at an angle,
    wherein the half mirror extends from an intersection of the first plane and the second plane in such a manner that the half mirror bisects the angle between first plane and the second plane,
    wherein the first display section has a first display surface that is disposed to an opposite side of the first plane from the half mirror and is distant from the first plane, and
    wherein the second display section has a second display surface disposed on the second plane.

3. The electronic mirror according to claim 1,
    wherein the first display section further includes a first assistant line that cuts across the display region,
    wherein the second display section further includes a second assistant line that cuts across the frame image, and
    wherein a position of the second assistant line in the frame image corresponds to a position of the first assistant line in the display region.

4. The electronic mirror according to claim 1,
    wherein each of the first display section and the second display section includes a display panel that electrically changes a displayed image.

5. The electronic mirror according to claim 1,
    wherein the second display section includes a display panel on which a frame image is formed.

* * * * *